United States Patent
Liao et al.

(10) Patent No.: US 11,895,385 B2
(45) Date of Patent: Feb. 6, 2024

(54) INFRARED SENSOR WITH SWITCH

(71) Applicant: DONGGUAN BONTECK HARDWARE CO., LTD., Dongguan (CN)

(72) Inventors: Junnan Liao, Dongguan (CN); Junyun Liao, Dongguan (CN); Yaofeng He, Dongguan (CN); Haifu Zou, Dongguan (CN); Enwang Liao, Dongguan (CN)

(73) Assignee: Dongguan Bonteck Hardware Co., Ltd., Dongguan (CN)

( * ) Notice: Subject to any disclaimer, the term of this patent is extended or adjusted under 35 U.S.C. 154(b) by 132 days.

(21) Appl. No.: 17/655,410

(22) Filed: Mar. 18, 2022

(65) Prior Publication Data

US 2023/0009650 A1 Jan. 12, 2023

(30) Foreign Application Priority Data

Jul. 6, 2021 (CN) .......................... 202121519773.2

(51) Int. Cl.
| | |
|---|---|
| H04N 5/335 | (2011.01) |
| H04N 23/55 | (2023.01) |
| H04N 5/33 | (2023.01) |
| H04N 23/51 | (2023.01) |

(52) U.S. Cl.
CPC ............... *H04N 23/55* (2023.01); *H04N 5/33* (2013.01); *H04N 23/51* (2023.01)

(58) Field of Classification Search
CPC ...................................................... H04N 23/55
See application file for complete search history.

(56) References Cited

U.S. PATENT DOCUMENTS

| | | | |
|---|---|---|---|
| 8,646,936 B2* | 2/2014 | Goyal | H05B 47/115 |
| | | | 362/147 |
| 9,607,787 B2* | 3/2017 | Mittleman | H04N 5/77 |
| 11,650,096 B2* | 5/2023 | Liao | G01J 1/0271 |
| | | | 250/353 |
| 2020/0025607 A1* | 1/2020 | Nguyen | G01J 5/0818 |

* cited by examiner

*Primary Examiner* — Gary C Vieaux
(74) *Attorney, Agent, or Firm* — Thomas | Horstemeyer, LLP

(57) ABSTRACT

Disclosed is an infrared sensor with a switch, and relates to the technical field of infrared sensing. The infrared sensor further comprises a key and a function switch, wherein the function switch is fixed on a substrate and close to the direction of a Fresnel lens, the key is installed on the Fresnel lens, the key is connected with the function switch, a user can press the key and control the function switch to work, and the function switch is electrically connected with the substrate and used for switching the working state. The infrared sensor with a switch is simple in structure and convenient to operate.

9 Claims, 3 Drawing Sheets

INFRARED SENSOR WITH SWITCH

CROSS REFERENCE TO RELATED APPLICATION

This patent application claims the benefit and priority of Chinese Patent Application No. 202121519773.2, filed on Jul. 6, 2021, the disclosure of which is incorporated by reference herein in its entirety as part of the present application.

TECHNICAL FIELD

The present disclosure relates to the technical field of infrared sensing, and specifically relates to an infrared sensor with a switch.

BACKGROUND ART

According to an integrated infrared sensor circulating on the market at present, a function switch of the integrated infrared sensor is generally designed on the back surface of the sensor, and is also designed on the top surface or the bottom surface of the sensor, and is also designed on the side surface of the sensor. After the sensor with the similar design is installed in a lamp, the function switch is surrounded by the lamp. When the function switch is needed, either the sensor needs to be rotated or the lamp needs to be rotated or the shell of the lamp needs to be opened to expose the function switch, then the function switch is operated to set the function, and finally the sensor needs to be rotated to return or the lamp needs to be rotated to return, or the shell of the lamp is installed to return. Sensors with similar designs have the defects of inconvenience in operation, complex structure, troublesome installation, high cost, great use limitation and the like.

SUMMARY

The present disclosure aims to provide an infrared sensor with a switch to solve the problems in the prior art, and the infrared sensor with a switch is simple in structure and convenient to operate.

In order to achieve the purpose, the present disclosure provides the following scheme:

The present disclosure provides an infrared sensor with a switch, further comprising a key and a function switch, wherein the function switch is fixed on a substrate and arranged in the direction close to the Fresnel lens, the key is installed on the Fresnel lens, the key is connected with the function switch, a user can press the key and control the function switch to work, and the function switch is electrically connected with the substrate and used for switching the working state.

Preferably, a through hole is formed in the position, corresponding to the key, of the Fresnel lens, and the through hole is used for enabling the key to extend out of the outside.

Preferably, a mark is arranged at the position, corresponding to the key, of the Fresnel lens, and the mark can deform and is used for the user to check the position of the key and press the key.

Preferably, the infrared sensor further comprises a shell, a bottom cover and infrared probes, the shell comprises an upper surface and side walls, the upper ends and the lower ends of the side walls are fixedly connected with the upper surface and the bottom cover respectively, the substrate is fixed on the side walls, an arc-shaped notch and a side wire outlet hole are formed in the side walls, the arc-shaped notch is used for installing the Fresnel lens, and an upper wire outlet hole is formed in the upper surface; a lower wire outlet hole and drainage holes are formed in the bottom cover, and the upper wire outlet hole, the lower wire outlet hole and the side wire outlet hole are all used for leading out wires; and the infrared probes are fixed on the substrate, the Fresnel lens can focus human body heat on the infrared probes, and the infrared probes are used for controlling a lamp to be turned on and off.

Preferably, the side walls comprise a first side wall and two second side walls, the two second side walls are fixed to the two ends of the first side wall in the length direction respectively, the arc-shaped notch is formed between the ends, away from the first side wall, of the two second side walls, and the side wire outlet hole is formed in the first side wall; the second side wall is arc-shaped; and the first side wall is rectangular.

Preferably, the infrared sensor further comprises a first hollow nut and a second hollow nut; the first hollow nut is fixed on the upper surface, the upper wire outlet hole is formed by the first hollow nut, the second hollow nut is fixed on the bottom cover, the lower wire outlet hole is formed by the second hollow nut, and the drainage holes are formed around the second hollow nut.

Preferably, the number of the infrared probes is two, and the included angle between the center lines of the two infrared probes is 75°.

Preferably, the infrared sensor further comprises a baffle plate, the lower end of the baffle plate is fixed on the bottom cover, the baffle plate is fixed to the lower end of the substrate, and the baffle plate is fixed close to the Fresnel lens.

Preferably, a photosensitive part and a light-emitting diode are further fixed on the substrate, the photosensitive part is used for detecting the illumination of the external environment, the light-emitting diode and the infrared probes are all electrically connected with the function switch, the light-emitting diode can flicker when the infrared probes detect that a human body moves, and flickers at different frequencies and different times during function conversion, and light emitted by the light-emitting diode can penetrate through the Fresnel lens.

Preferably, the light-emitting diode is a three-primary-color light-emitting diode, and the three-primary-color light-emitting diode can emit different colors of light during function conversion.

Compared with the prior art, the present disclosure has the following technical effects:

According to the infrared sensor with a switch provided by the present disclosure, the function switch is fixed on the substrate and arranged in the direction close to the Fresnel lens, the key is installed on the Fresnel lens, the key is connected with the function switch, the key is used for a user to press and control the function switch to work, the function switch is electrically connected with the substrate and used for switching the working state of the infrared sensor with a switch, and then when the infrared sensor with a switch is connected with the lamp, the working state of the lamp is controlled through the infrared sensor with a switch, so that under the condition that any part does not need to be rotated or detached, mutual conversion among multiple functions can be achieved directly through operation of the key, and the infrared sensor is simple in structure and convenient to operate.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

Figure 1:
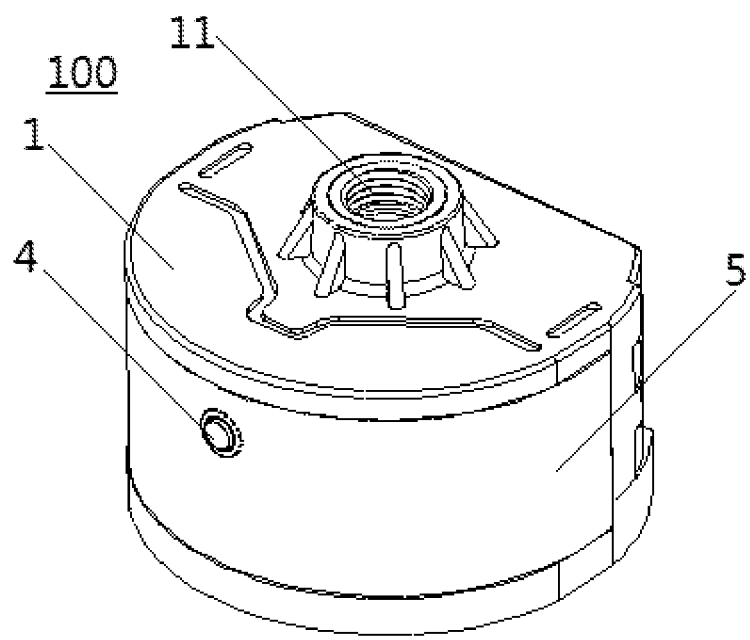
FIG. 1 is a structural schematic diagram of an infrared sensor with a switch provided by the present disclosure in one angle.
Figure 2:
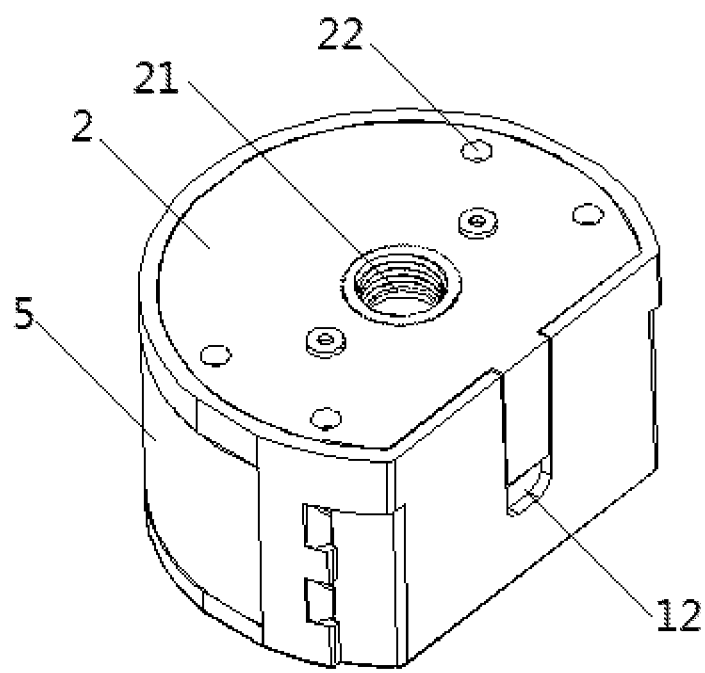
FIG. 2 is a structural schematic diagram of an infrared sensor with a switch provided by the present disclosure in the other angle.

Reference signs: 100, infrared sensor with switch; 1, shell; 11, upper wire outlet hole; 12, side wire outlet hole; 2, bottom cover; 21, lower wire outlet hole; 22, drainage hole; 3, function switch; 4, key; 5, Fresnel lens; 51, through hole; 6, substrate; 7, baffle plate; 8, infrared probe; 91, light-emitting diode; and 92, photosensitive part.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The present disclosure aims to provide an infrared sensor with a switch to solve the technical problems that an existing infrared sensor is complex in function switching mode and inconvenient to operate.

To make the foregoing objective, features and advantages of the present disclosure clearer and more comprehensible, the present disclosure is further described in detail below with reference to the attached figures and specific embodiments.

As shown in FIG. 1 to FIG. 6, the infrared sensor 100 with a switch provided by the present disclosure comprises a Fresnel lens 5 and a substrate 6 and further comprises a key 4 and a function switch 3, wherein the function switch 3 is fixed on the substrate 6 and arranged in the direction close to the Fresnel lens 5, the key 4 is installed on the Fresnel lens 5, the key 4 is connected with the function switch 3, the key 4 is used for a user to press and control the function switch 3 to work, the function switch 3 is electrically connected with the substrate 6 and used for switching the working state of the infrared sensor 100 with a switch, and then when the infrared sensor 100 with a switch is connected with a lamp, the working state of the lamp is controlled through the infrared sensor 100 with a switch, so that under the condition that any part does not need to be rotated or detached, mutual conversion among multiple functions can be achieved directly through operation of the key 4, and the infrared sensor is simple in structure and convenient to operate. Preferably, the function conversion comprises light color switching and night mode switching (for example, the night mode is turned on through pressing, the lamp is in a semi-bright state, the control of infrared probes is not needed, and only the control of a photosensitive part is achieved; and the night mode is turned off through pressing again), the setting of continuous light-on time after the human body activity is detected (for example, the default time is 2 minutes, the setting time is 5 minutes after two times of pressing, and the default time is recovered after two times of pressing again) and the like, and the functions can be directly realized through operation of the function switch 3.

Figure 3:
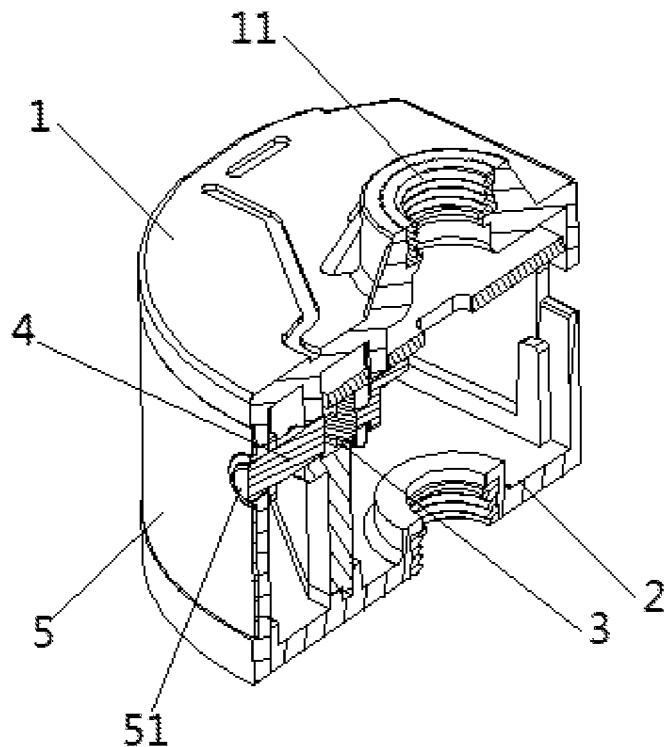
FIG. 3 is a partial structural schematic diagram of an exposed key of an infrared sensor with a switch provided by the present disclosure.

Specifically, as shown in FIG. 3, a through hole 51 is formed in the position, corresponding to the key 4, of the Fresnel lens 5, and the through hole 51 is used for enabling the key 4 to extend out of the outside, so that the user can conveniently find the position of the key 4 and press the key 4, the use is convenient, and an exposed key is formed.

Figure 4:
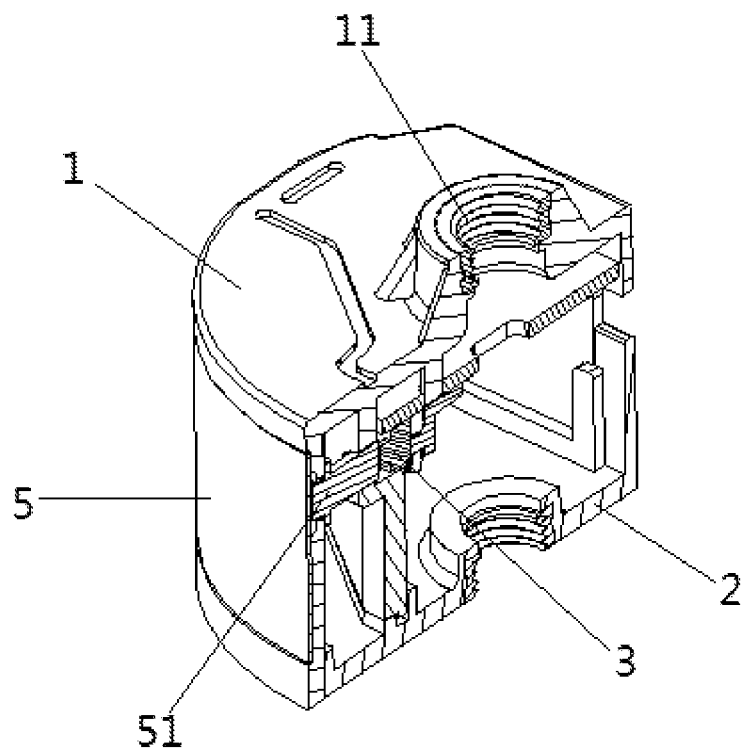
FIG. 4 is a partial structural schematic diagram of a hidden key of an infrared sensor with a switch provided by the present disclosure.
Figure 5:
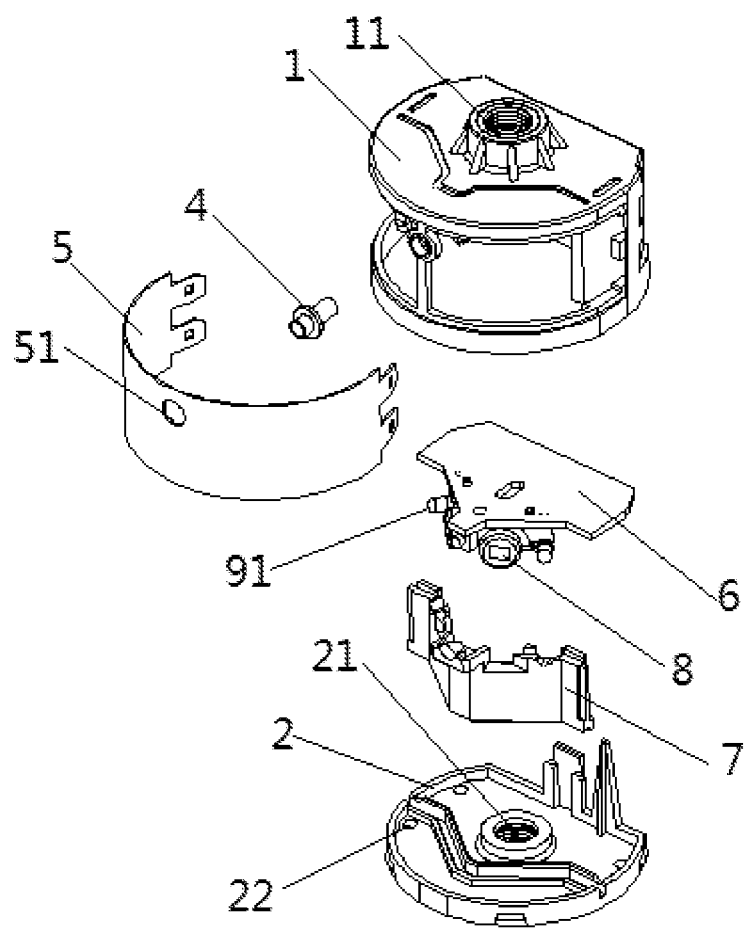
FIG. 5 is an explosive view of an infrared sensor with a switch provided by the present disclosure.
Figure 6:
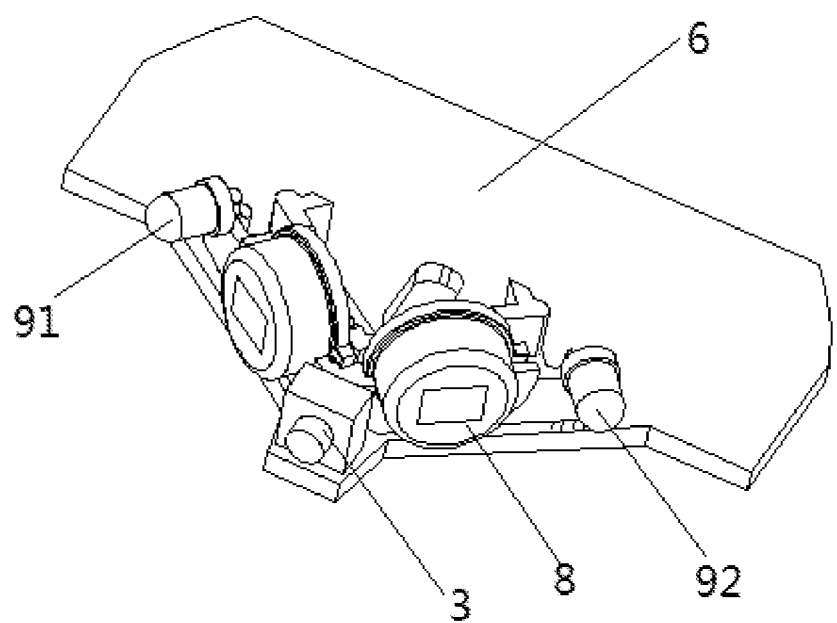
FIG. 6 is a structural schematic diagram of a substrate in an infrared sensor with a switch provided by the present disclosure.

As shown in FIG. 4, a mark is arranged at the position, corresponding to the key 4, of the Fresnel lens 5, and the mark can deform and is used for the user to check the position of the key 4 and press the key 4. A hidden key is arranged, and the key 4 is positioned through the mark, so that the attractiveness of the whole structure is guaranteed.

The infrared sensor 100 with a switch provided by the present disclosure further comprises a shell 1, a bottom cover 2 and infrared probes 8, the shell 1 comprises an upper surface and side walls, the upper ends and the lower ends of the side walls are fixedly connected with the upper surface and the bottom cover 2 respectively so as to play roles in sealing and protecting components and parts in the shell 1, an arc-shaped notch and a side wire outlet hole 12 are formed in the side walls, the arc-shaped notch is used for installing the Fresnel lens 5, and an upper wire outlet hole 11 is formed in the upper surface; a lower wire outlet hole 21 and drainage holes 22 are formed in the bottom cover 2, and the upper wire outlet hole 11, the lower wire outlet hole 21 and the side wire outlet hole 12 are all used for leading out wires to connect electrical apparatus elements such as a power source, so that the problem that one infrared sensor cannot be applied to different shapes or structures of lamps is solved, and the applicability and the practicability of the infrared sensor are improved; and the infrared probes 8 are fixed on the substrate 6, the Fresnel lens 5 can focus human body heat on the infrared probes 8, and the infrared probes 8 are used for controlling the lamp to be turned on and off. When a human body passes through a sensing range, heat released by the human body is gathered on the infrared probes 8 through the Fresnel lens 5, the heat is received by the infrared probes 8, and the infrared probes 8 convert the heat into an electric signal and input the electric signal into an electronic circuit to drive a load to work, so that the lamp is controlled to be turned on when the human body passes.

Specifically, the side walls comprise a first side wall and two second side walls, the two second side walls are fixed to the two ends of the first side wall in the length direction respectively, the arc-shaped notch is formed between the ends, away from the first side wall, of the two second side walls, and the side wire outlet hole 12 is formed in the first side wall; the second side wall is arc-shaped; and the first side wall is rectangular. The wires can be led out conveniently through the wire outlet holes, so that an external power source and a lamp load can be connected to work conveniently.

The infrared sensor 100 with a switch provided by the present disclosure further comprises a first hollow nut and a second hollow nut; the first hollow nut is fixed on the upper surface, the upper wire outlet hole 11 is formed by the first hollow nut, the second hollow nut is fixed on the bottom cover 2, the lower wire outlet hole 21 is formed by the second hollow nut, and the drainage holes 22 are formed around the second hollow nut in the circumferential direction. The drainage holes 22 are used for guiding water out when water exists in the shell 1, and the danger caused by water inflow of electronic components and parts is prevented.

The number of the infrared probes 8 is two, and the included angle between the center lines of the two infrared probes 8 is 75°. When the two infrared probes 8 are arranged, the 220-degree sensing range in front of the infrared sensor can be monitored, and when one infrared probe 8 is arranged, the 180-degree sensing range in front of the infrared sensor can be monitored.

The infrared sensor 100 with a switch provided by the present disclosure further comprises a baffle plate 7, the baffle plate 7 is fixed to the lower end of the substrate 6, and the baffle plate 7 is fixed close to the Fresnel lens 5. The baffle plate 7 is used for preventing water and electric shock.

A photosensitive part 92 and a light-emitting diode 91 are further fixed on the substrate 6, the photosensitive part 92 is used for detecting the illumination of the external environment without controlling the lamp to be turned on when the illumination of the environment is sufficient, the light-emitting diode 91 and the infrared probes 8 are all electrically connected with the function switch 3, the light-emitting diode 91 can flicker when the infrared probes 8 detect that a human body moves, and flickers at different frequencies and different times during function conversion, and light emitted by the light-emitting diode can penetrate through the Fresnel lens, so that the current working mode indication can be conveniently distinguished through different flickering frequencies or flickering times.

The light-emitting diode 91 is a three-primary-color light-emitting diode, and the three-primary-color light-emitting diode can emit different colors of light during function conversion. Different working modes can be distinguished more conveniently by directly judging the color of light, but the light-emitting diode 91 provided by the present disclosure is not limited to a three-primary-color light-emitting diode, can be a single-color light-emitting diode or other kinds of light-emitting diodes, as long as it can play a role in indication to allow the user to judge corresponding functions. When the light-emitting diode 91 is a monochromatic light-emitting diode, different working modes can be directly distinguished through different flicker frequencies and flicker times.

Specific examples are used for illustration of the principles and implementation methods of the present disclosure. The description of the above-mentioned embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. An infrared sensor with a switch, comprising a Fresnel lens and a substrate, wherein the infrared sensor further comprises a key and a function switch, the function switch is fixed on the substrate and arranged in a direction close to the Fresnel lens, the key is installed on the Fresnel lens, the key is connected with the function switch, a user can press the key and control the function switch to work, and the function switch is electrically connected with the substrate and used for switching working states; and wherein a through hole is formed in a position, corresponding to the key, of the Fresnel lens, and the through hole is used for enabling the key to extend out of the outside.

2. The infrared sensor with a switch according to claim 1, wherein a mark is arranged at the position, corresponding to the key, of the Fresnel lens, and the mark can deform and is used for the user to check a position of the key and press the key.

3. The infrared sensor with a switch according to claim 1, wherein the infrared sensor further comprises a shell, a bottom cover and infrared probes, the shell comprises an upper surface and side walls, upper ends and lower ends of the side walls are fixedly connected with the upper surface and the bottom cover respectively, the substrate is fixed on the side walls, an arc-shaped notch and a side wire outlet hole are formed in the side walls, the arc-shaped notch is used for installing the Fresnel lens, and an upper wire outlet hole is formed in the upper surface; a lower wire outlet hole and drainage holes are formed in the bottom cover, and the upper wire outlet hole, the lower wire outlet hole and the side wire outlet hole are all used for leading out wires; and the infrared probes are fixed on the substrate, the Fresnel lens can focus human body heat on the infrared probes, and the infrared probes are used for controlling a lamp to be turned on and off.

4. The infrared sensor with a switch according to claim 3, wherein the side walls comprise a first side wall and two second side walls, the two second side walls are fixed to the two ends of the first side wall in a length direction respectively, the arc-shaped notch is formed between ends, away from the first side wall, of the two second side walls, and the side wire outlet hole is formed in the first side wall; the second side wall is arc-shaped; and the first side wall is rectangular.

5. The infrared sensor with a switch according to claim 3, wherein the infrared sensor further comprises a first hollow nut and a second hollow nut; the first hollow nut is fixed on the upper surface, the upper wire outlet hole is formed by the first hollow nut, the second hollow nut is fixed on the bottom cover, the lower wire outlet hole is formed by the second hollow nut, and the drainage holes are formed around the second hollow nut.

6. The infrared sensor with a switch according to claim 3, wherein a number of the infrared probes is two, and an included angle between the center lines of two infrared probes is 75°.

7. The infrared sensor with a switch according to claim 3, wherein the infrared sensor further comprises a baffle plate, a lower end of the baffle plate is fixed on the bottom cover, the baffle plate is fixed to a lower end of the substrate, and the baffle plate is fixed close to the Fresnel lens.

8. The infrared sensor with a switch according to claim 3, wherein a photosensitive part and a light-emitting diode are further fixed on the substrate, the photosensitive part is used for detecting the illumination of the external environment, the light-emitting diode and the infrared probes are all electrically connected with the function switch, the light-emitting diode can flicker when the infrared probes detect that a human body moves ad flickers at different frequencies and different times during function conversion, and light emitted by the light-emitting diode can penetrate through the Fresnel lens.

9. The infrared sensor with a switch according to claim 8, wherein the light-emitting diode is a three-primary-color light-emitting diode, and the three-primary-color light-emitting diode can emit different colors of light during function conversion.

\* \* \* \* \*